Patented Jan. 16, 1934

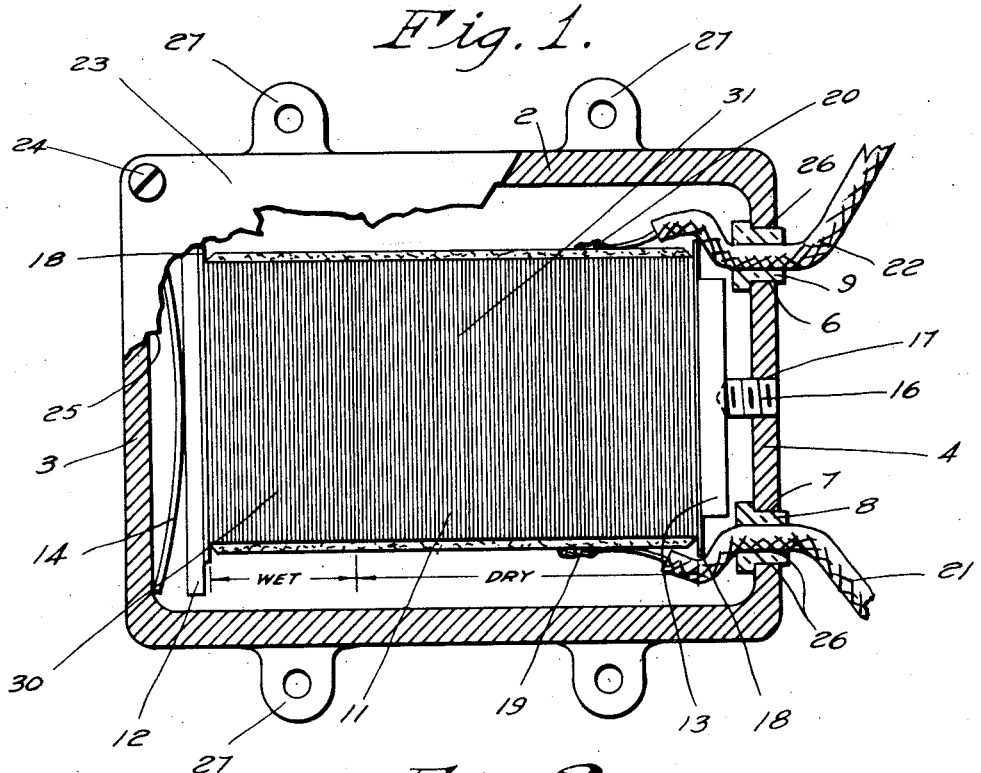
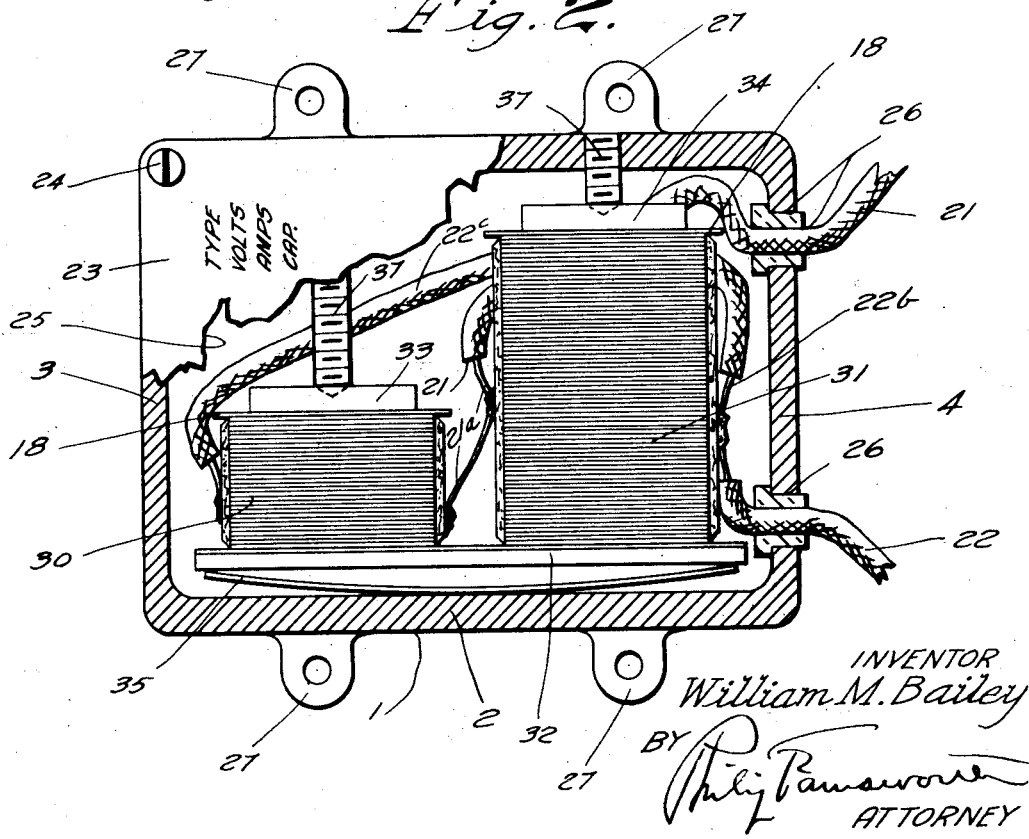

1,943,713

UNITED STATES PATENT OFFICE 1,943,713

APPARATUS FOR SECURING ZERO CAPACITY-TEMPERATURE COEFFICIENT

William M. Bailey, Lynn, Mass., assignor, by mesne assignments, to General Electric Company, a corporation of New York Application April 3, 1930. Serial No. 441,199

30 Claims. (Cl. 175—41)

This invention relates to an improved apparatus for producing a low or substantially zero capacity-temperature effect in capacitors.

In the use of electrical measuring intsruments, such as voltmeters, ammeters, wattmeters, frequency meters, and the like, which may be permanently mounted in outdoor installations, considerable difficulty has been experienced in keeping the constants of the meter circuits at anything approximating a uniform value from one season to another. This trouble is due mainly to the fact that diurnal and seasonal temperature changes of the atmosphere over a range of substantially fifty centigrade degrees (ninety Fahrenheit degrees) cause undesirable changes in the dielectric values of the capacitors employed, with resulting variations in capacity values.

An object of this invention is the provision of an improved capacitor having a substantially zero capacity-temperature effect.

A further object of this invention is the provision of an improved capacitor having portions characterized by positive and negative capacity-temperature characteristics so arranged as to produce a substantially zero capacity-temperature effect.

In the drawings, like numerals refer to similar parts throughout the several views, of which Fig. 1 is a front view partly in section, of a capacitor embodying the invention, the casing-cover being broken away to show the enclosed stack;

Fig. 2 is a view similar to Fig. 1 of a modified type of assembly of the stack portions;

The inherent disadvantages above referred to, are overcome by the present invention, in the practice of which the capacitor for any given external circuit is suitably divided, and the divided portions are made up to include dielectrics which respectively possess positive and negative capacity-temperature characteristics. Such divided portions are so constitued and arranged with respect to their dimensions and capacities as finally assembled that their respective positive and negative capacity-temperature characteristics substantially neutralize each other over substantially the whole desired temperature range, thus providing a unit having an effective and substantially zero capacity-temperature effect, that is, a capacitor having substantially the same capacity at all temperatures over the wide range of temperatures for which it may be designed on any individual instance.

As particular examples of dielectrics which are suitable in appropriate combination in the respective portions of the capacitor, for uses comprehended within the spirit and scope of the present invention, mention is made of mica or mica and air as a dielectric which has a positive capacity-temperature characteristic, and of paraffin wax or such wax and mica as a dielectric material which has a negative capacity-temperature characteristic. These materials are cited as exemplars only, of materials which are suitable for use in the improved combination of the present invention, any suitable association of dielectrics being comprehended within the spirit and scope of the present invention. Air alone is also positive, while castor oil and some of the other waxes like syncera and halowax are also negative.

Figure 3:
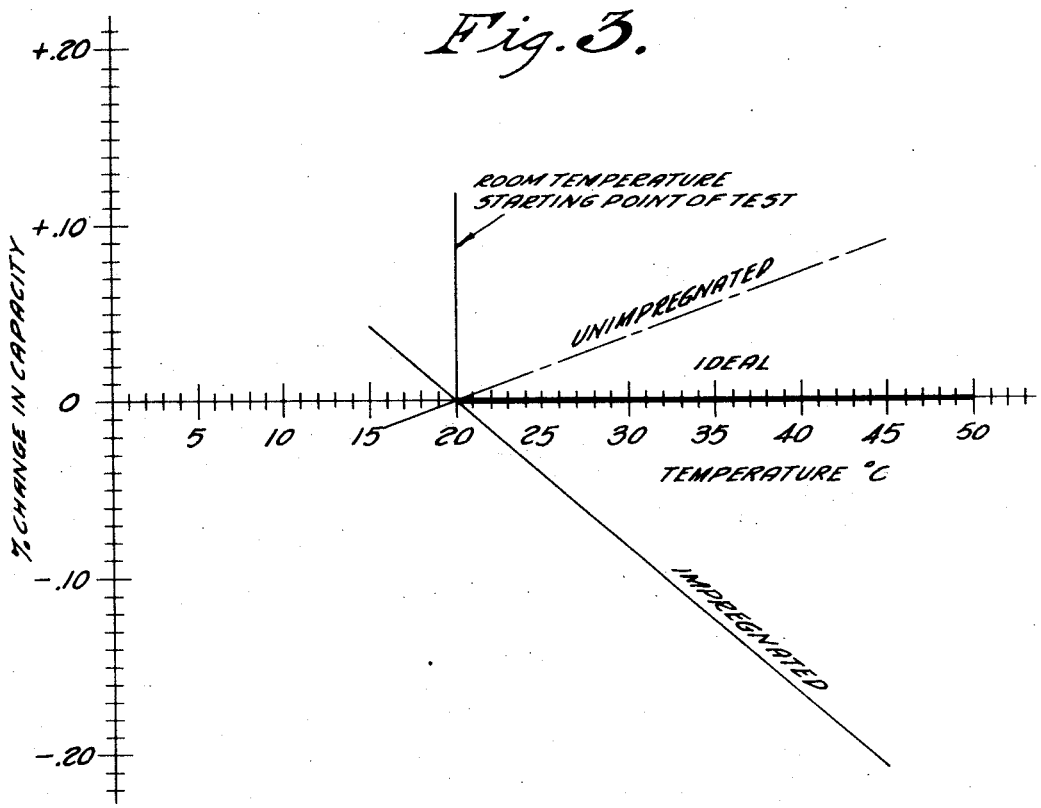
Fig. 3 shows capacity-temperature graphs of a wax impregnated capacitor, a non-impregnated capacitor and the novel ideal or compensated capacitor as exemplified in Figs. 1 and 2.

Referring to Fig. 3 of the accompanying drawings, there are shown by way of example the results of measurements of the capacity-temperature coefficients of (1) at lower right, a wax impregnated stack, i. e., wherein the armature foils and mica dielectric sheets are separated by layers of a dielectric wax; (2) at upper right, a non-impregnated stack (i. e. one in which the armature foils and dielectrics are in immediate contact instead of being separated by substantial layers of wax displacing air pockets between them, and which is hereinafter designated as the mica-non-impregnated stack), and that of (3), horizontal right, a composite stack or a combination of stacks having both impregnated and non-impregnated sections, i. e., the ideal capacitor of the present invention. In this figure representing variation in capacity (scale at left, vertical) plotted against temperature variation (horizontal scale), a uniform pressure of about 120 lbs. per sq. in. was maintained on the ends of the stacks of all the three units under test.

Referring specifically to Fig. 3 there is shown at lower right the capacity-temperature curve for a capacitor including an impregnating material having a negative change in capacity-temperature characteristic. From this curve it will be noted that such materials (as mica and wax between the foils) are characterized by a marked decrease in capaicty with increase in temperature. This is particularly noticeable with increasing temperature, where the capacity drops very sharply at the higher temperatures approaching that of the melting point of the impregnant layers. A capacitor having such a characteristic caused an appreciable change in the capacity of an external circuit in which the capacitor was connected, if the operating or external atmospheric temperature were to exceed a relatively small range, and such change is a serious one in a circuit including measuring instruments such as above. A maximum safe working temperature for some of the dielectric waxes is as follows:

| Wax | Temperature °C. |
|---|---|
| Paraffin | 45 |
| Halowax | 75 |
| Syncera | 60 |

Where the temperature exceeds this range it is to be expected that the accompanying capacity change would be so rapid as not readily susceptible of effective compensation by ordinary mechanical means, such as follower springs abutting an end of a capacitor and urging it, under constant pressure, against a fixed abutment.

Such conditions also are true of the type of capacitor whose capacity-temperature effect is positive as in the case of a non-impregnated mica stack capacitor whose capacity-temperature curve is illustrated in Fig. 3 of the drawings at upper right. In this case, while the capacity-temperature coefficient is positive, the capacity increasing with increasing temperature, nevertheless the change in capacity value is quite pronounced and approximately as deleterious to the exactitude of operation of apparatus in circuit as is that of a material (as wax adjacent the micas) having a negative coefficient.

The deleterious capacity-temperature effects of the above two types of capacitors (illustrated by mica and foil stacks respectively with and without wax layers of substantial thickness) are substantially overcome, according to the present invention, by including, in a capacitor assembly, portions or sections having substantially equal and opposing capacity-temperature effects. These effects, it will be appreciated, are the resultants of the capacity-temperature characteristics of the respective different dielectrics. Thus, a mica-foil capacitor stack having a substantially zero capacity-temperature effect, as indicated graphically in Fig. 3 by the heavy horizontal line marked "Ideal", may include about seventy to ninety percent non-impregnated or dry sections (31, Figs. 1-2) and the remaining sections wax-impregnated, or "wet" sections 30, Figs. 1-2. This particular groupment of the "wet" and "dry" sections, as above defined, is susceptible of wide variation, according to the types of dielectrics used, and the pressure applied to the stack assemblies. The spacing between the dielectrics and the armatures of the device will vary with such mechanical pressure, so that the volume of air in the dry section or portion will depend upon the pressure; the greater the pressure, the smaller the air volume, and the smaller the air volume, the smaller may be the wet capacitor section or portion. In the foregoing description, a uniform pressure is assumed to be applied to the sections in order to bring out the effect of the kind of dielectric used and the relative physical dimensions of the wet and dry sections.

Figs. 1 and 2 illustrate exemplary embodiments of the invention.

Referring to Fig. 1, there is shown, in elevation and in vertical cross-section, a capacitor structure embodying the present invention. This assembly includes a box-like casing having side-walls 2, 3 and 4, the latter formed with apertures 6, 7 adapted to receive insulating terminal-lead bushings 8, 9. The casing, preferably of metal as shown, may be of aluminum, any of the bronzes, or other suitable metals having the requisite mechanical strength and electrical characteristics. But the casings may be made of structural insulating material such as porcelain, isolantite, bakelite, etc. Or they may be made of iron, steel and other ferrous alloys for constructions for use in 60 cycle or D. C. circuits, up to substantially 10,000 volts and beyond. The casing usually is formed with a large opening as shown, of sufficient size to permit the introduction and adjustment of the stack structure 11 and its associated pressure plates 12, 13, previous to enclosing thereof by the attachment of cover 23 to close the large opening.

The pressure plate 12 faces against one end of stack 11. At the other end of the stack structure, a co-operating pressure plate 13, is adjustably abutted against the stack by means of a threaded screw 16, engaging a suitable threaded aperture 17 in the wall 4 of the casing. In assembling, screw 16 is turned to the extent desired, as hereinafter described, to adjust plate 13 by a slight leftward movement and compress stack 11 against left-hand plate 12, whereupon the projecting head of screw 16 may be sawn off flush with the exterior of the casing as shown, as common heretofore in similar structures not embodying the invention hereof. Also, as used heretofore for the purpose of providing "live" pressure on the stack during service, a resilient follow-up plate above generally referred to and diagrammatically indicated at 14, consisting of soft rubber or cork, or of deformed metal, may be interposed, between casing-wall 3 and the non-adjusted pressure-plate 12, if desired, so as to provide for automatic adjustment of stack-pressure by yielding to increase of stack-length by temperatures by service-currents and thereby prevent undue increase of pressure during service and in turn maintain permanently the pressure initially provided by the adjustment of screw 16, at various degrees of internal heating by service currents. When resilient plate 14 is employed, it is sufficiently unyieldable, as heretofore, to permit the establishment of the desired stack-pressure by turning screw 16, the function of plate 14 being to maintain thereafter the stack-pressure and capacity established by screw 16 at various degrees of internal stack-heating by service currents.

Insulating sheets 18, of fish paper, mica, bakelite, or any other suitable material are interposed between the ends of the stack and the pressure plates. The foils of opposite potential are brought outside the respective sides of the stack and soldered together as indicated at 19, 20, or as shown, a plurality of relatively stiff conducting sheets may be connected to the foils, as terminal tabs therefor. Insulated terminal leads 21, 22 are soldered to the terminal portions 19, 20 of the stack, and are led out of the casing through the insulating bushings 8, 9, above referred to.

The casing aperture is provided with a cover 23, adapted to be secured to the casing walls by means of a plurality of screws 24, or other suitable securing means, tapped into the casing. A water-tight seal between the casing and its cover is obtained by interposing therebetween a yieldable gasket of rubber or other like material at 25, although lead or other soft metal may also be used with like effect. The cover 23, which is free of terminal holes, is also adapted to serve as a nameplate which may contain appropriate information regarding electrical characteristics as well as the usual patent markings and other indicia. This permits a desirable saving in that it is not necessary to make use of a separate nameplate containing this information, and also avoids the necessity of separately mounting such a nameplate as well as permitting a saving of the labor usually required for such purposes.

The insulating bushings 8, 9 may be cemented in their respective apertures by any suitable waterproof plastic cement at 26, which cement is also used to provide a water tight seal between the bushings and the insulated terminal leads. Thus the interior of the casing is maintained in operation wholly free from deleterious atmospheric influences, such as moisture, sulphurous vapors, and other like disturbing conditions.

The casing may be provided with integral apertured mounting lugs 27, in order to permit its installation as a unit of a meter structure, as against a room-wall, or for separate mounting.

The capacitor proper, Fig. 1, comprises a "wet" section 30, and a "dry" section 31. The "wet" or impregnated section 30 may include the usual mica stack or roll paper capacitor, impregnated with a suitable compound, such as paraffin wax or equivalent compounds, noted above. The "dry" or non-impregnated section 31 is structurally similar to the wet section, but is characterized by the absence of an impregnant, in the present instance, which makes mica (or paper-air) the effective interarmature dielectric. (If the clamping pressure on portion 31 is so low as not to exclude air from between the sheets, then of course the dielectric will include the dielectric sheets plus such air as may not have been excluded.) The different sections are so chosen as to number of foils, dielectrics and (in the case of the "wet" sections) the impregnant, with relation to the mechanical pressure on the faces of the capacitor elements by means of the clamp shown, that the resulatnt capacity-temperature effects of the portions or sections 30—31 neutralize each other, giving a substantially zero capacity-temperature effect. In the construction shown in Figs. 1 and 2, the complete capacitor in each case comprises substantially seventy to ninety percent mica (or mica-air) or non-impregnated portion 31 having a positive capacity-temperature effect, and substantially thirty to ten percent impregnated portion 30 having a negative capacity-temperature effect equal to or substantially approximating the positive capacity-temperature effect of the other section whereby there is eliminated the cost of labor and impregnant for the far greater portion of the entire capacitor. While the section 31 having a positive capacity-temperature effect has been cited as being non-impregnated, i. e., as depending upon the positive capacity-temperature characteristic of mica-air, yet it will be clearly understood that, as already pointed out, any impregnating dielectric having a positive capacity-temperature characteristic may be substituted therefor without exceeding the spirit and scope of the present invention, due regard being had for the required or desired capacity-temperature effect necessary in a given installation and the relation of the mechanical pressure to the character of the impregnant.

Where a closer or individual control of the capacity-temperature effects of the several sections, or of the capacitor as a whole, is desired or may be found necessary, the invention comprehends the following novel construction of Figure 2 as an embodiment: The sections 30 and 31 are disposed in the casing out of end to end relation with one another, and are provided with a common pressure plate 32, and individual pressure plates 33, 34, abutting the stacks at the opposite ends. A plurality of adjusting screws 37 are tapped into the opposite wall of the casing from the spring member 35, and are adapted to coact with pressure plates 33, 34, to force the stacks into compressing engagement with the common pressure plate 32. In this manner it is possible to vary either of the individual capacities of the several sections 30, 31 without altering the capacity of the other associated section the principal effect however being to vary the volume of air inside the non-impregnated portion 31 and therefore by increased compression reduce the positive capacity temperature characteristic of a mica stack as 30. As in the case of Fig. 1, the adjustment of pressure on waxed stack-portion 30 merely varies its capacity to a desired degree, without varying the quantity of wax (unless the pressure be applied before the wax has frozen hard as is permissible) and therefore without varying the capacity-temperature characteristic of this stack-portion 30; but in a case where no wax whatsoever is used in portion 31 to replace any air spaces between the foils and the dielectric sheets, the stack-pressure may be made so great as to force out some of the air and thereby adjust the capacity-temperature characteristic of portion 31 to that of portion 30, by reducing the positive characteristic of portion 31. As described with reference to Fig. 1, so in Fig. 2 provision may be made for automatic maintenance during service, of the above installation adjustments under various degrees of internal stack-heating by service currents, by interposing between the casing-wall 2 and the non-adjusted pressure-plate 32, a resilient plate diagrammatically indicated at 35, consisting of soft rubber, cork or de-formed (permanently bent) metal. When, for the purpose of reducing quantity of expensive material employed, the pressure-plate 32 is replaced by two plates, one on each of stack-portions 30 and 31, then for the same purpose of economy, the automatic pressure-adjusting resilient plate 35 may be replaced by two shorter plates, one for each of the two pressure-plates replacing single pressure-plate 32; all without altering the above conditions for adjustment save to carry to a further but unnecessary extent the independency of adjustment of 30 and 31; for in any case when a resilient automatic pressure-maintaining plate as 35, Fig. 2, or 14, Fig. 1, is employed, it must be sufficiently unyieldable to permit establishment initially by the adjusting screw of the desired stack-pressure. In any case when any automatic pressure-maintaining means is employed, it may be secured to the casing, when necessary or desired, by any suitable means. The terminal leads 21, 22 are connected to the stack terminals in the usual manner, lead 21 being provided with an end inside the casing, designated generally as 21a, which is soldered to adjacent foil tabs or terminals of the two stacks 30, 31, thus serving as a common lead for both. Lead 22 may be soldered to the other stack terminal of stack 30 in the usual manner, as indicated at 22a, and at a portion adjacent the corresponding terminal of the other stack 31, may be provided with a bared portion 22b, which is soldered to the stack terminal in the usual manner. The intermediate portion 22c of this lead 22 may be replaced by a separate section of insulated wire, in which event the lead 22 will be separately soldered to the stack terminal adjacent an end of, and in conductive electrical connection with an end of member 22c at 22b.

The sections in Fig. 2 are mounted in the casing as described, and the latter sealed by the gasket 25 and cover 23. No embedment of the stacks in the casing of Figs. 1 and 2 is used in the described constructions as it is preferable that no dielectric material outside the stacks be incorporated with the capacitor sections 30, 31 after they have been made up and inserted in the casing.

Figure 4:
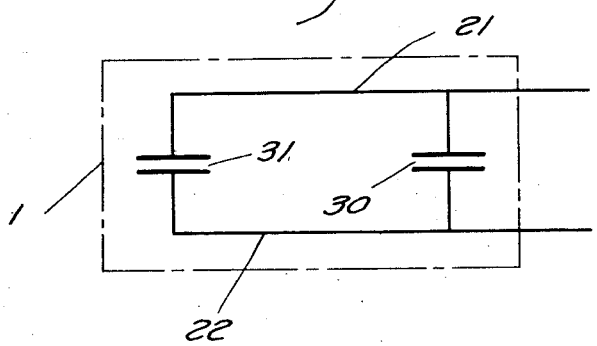
Fig. 4 is a circuit diagram of two portions of the stack.

It will be seen, from an inspection of the circuit diagram of Fig. 4 that the constructions described in Figs. 1 and 2 are electrically equivalent, the difference in structure involving only mechanical features concerned in Fig. 2 with the adjustment of the capacity-temperature characteristics of the respective stacks 30, 31.

While the invention has been described with respect to a parallel capacitor structure Figs. 4, 1 and 2 it is susceptible of use in series constructions in which the metal casing is also adapted to serve as a terminal. Such a construction is shown and described in my application, Serial No. 402,164, filed 24 October, 1929.

It will now be appreciated that there has been provided a novel apparatus for maintaining a substantially zero capacity-temperature characteristic in capacitors subjected, when in use, to pronounced variations in temperature, which is further characterized by simplicity in operation as well as economy in fabrication and adjustability to exactitude of characteristics for neutralization of the respective impregnated and non-impregnated sections or portions.

While the effects of temperatures below that of normal room temperature have not been measured it is thought the graphs below room temperature may cross as shown in Fig. 3 (at left of 20) and possibly be closer to the zero line for a given temperature decrease than for a temperature increase of the same amount. In all cases the combined effect is substantially a zero capacity-temperature characteristic.

What I claim is:

1. A mica capacitor having sections having mica and air as a dielectric and other sections having mica and a wax as a dielectric.

2. A capacitor having substantially a zero capacity-temperature effect, and including two portions each including mica and foil sheets, one of said portions possessing a positive capacity-temperature characteristic and the other of said portions including dielectric impregnation between the foil and mica sheets in amounts causing a negative capacity-temperature characteristic of said portion which substantially neutralizes the positive characteristic of the first portion and imparts a substantially zero characteristic to the capacitor as a whole.

3. A capacitor, including a section provided with a dielectric having a negative capacity-temperature characteristic and another section having a dielectric with a positive capacity-temperature characteristic, the dielectric in only one of said sections being impregnated.

4. A capacitor, including impregnated and non-impregnated sections and having a capacity-temperature effect of substantially zero.

5. The combination with a capacitor having a positive capacity-temperature characteristic, of a second capacitor in circuit with the first capacitor and having a negative capacity temperature characteristic, only one of said capacitors being impregnated.

6. A capacitor comprising sections including air as a dielectric and other sections including paraffin wax as a dielectric.

7. A capacitor having a zero capacity-temperature effect and comprising sections including air as a dielectric and other sections including halo-wax as a dielectric.

8. A capacitor having a zero capacity-temperature effect and comprising sections including air as a dielectric and other sections including syn-cera wax as a dielectric.

9. A mica capacitor having substantially a zero capacity-temperature effect and including mica sheets and foil sheets of which the greater proportion are separated from one another by dielectric wax and the rest of which are in immediate surface contact with one another, said respective proportions possessing opposite capacity-temperature characteristics which substantially neutralize one another over a wide range of temperatures of the atmosphere of the vicinity where the capacitor is located.

10. The combination with a capacitor having a positive capacity-temperature characteristic, of a second capacitor in circuit with the first capacitor and having a negative capacity temperature characteristic, and means maintaining an individual control of said characteristics of said two capacitors, said means including individual pressure-plates bearing against the respective capacitors and screws by which pressure is applied independently to said pressure-plates.

11. A capacitor assembly including two portions each including mica and foil sheets, and a casing in which said portions are located in positions spaced from the walls of the casing; the exterior surfaces of said portions being free of embedding wax; and one of said portions possessing a positive capacity-temperature characteristic, the other including dielectric impregnation between the foil and mica sheets in amount causing a negative capacity-temperature characteristic of said portion which substantially neutralizes the positive characteristic of said first portion.

12. A capacitor including two cooperating portions of which each includes mica sheets stacked together with the armatures, one of said stacked portions being much larger than the other and naturally having a high positive capacity-temperature characteristic; means compressing together said elements of said larger stack-portion reducing said high positive characteristic thereof; and an impregnant of negative capacity-temperature characteristic for said smaller stack-portion between the micas and armatures thereof; said impregnated smaller stack-portion containing an amount of such impregnant which causes the capacity-temperature characteristic of said portion to be negative and also more or less nearly equal to said reduced positive characteristic of the non-impregnated stack-portion; and said compressing means including an element for adjusting said characteristic of said non-impregnated stack-portion to a condition of more nearly exact equivalency with said opposite characteristic of said impregnated stack-portion.

13. A capacitor including two cooperating portions of which each includes mica sheets stacked together with the armatures, one of said stacked portions being much larger than the other and naturally having a high positive capacity-temperature characteristic; means compressing together said elements of said larger stack-portion reducing said high positive characteristic thereof; and an impregnant of negative capacity-temperature characteristic for said smaller stack-portion between the micas and armatures thereof; said impregnated smaller stack-portion containing an amount of such impregnant which causes the capacity-temperature characteristic of said portion to be negative and also substantially equal to said reduced characteristic of said much larger non-impregnated stack-portion.

14. A capacitor including two cooperating portions of which each includes mica sheets stacked together with the armatures, a dielectric impregnant for only one of said stacked portions between the micas and the armatures thereof, said dielectric impregnant having a negative capacity-temperature characteristic; and means compressing together said elements of the non-impregnated stack-portion thereby reducing the positive capacity-temperature characteristic of said portion; said impregnated mica stack-portion including an amount of such impregnant causing the characteristic of said portion to be negative and also more or less nearly equal to said reduced positive characteristic of the non-impregnated stack-portion; and said compressing means including an element for adjusting said characteristic of said non-impregnated stack-portion to a condition of more nearly exact equivalency with said opposite characteristic of said impregnated stack-portion.

15. A capacitor including two cooperating portions of which each includes mica sheets stacked together with the armatures, said capacitor as a whole having a substantially constant capacity over the working-temperature range by means of the provision of one of said stacks much larger than the other and the provision of a dielectric impregnant for only the smaller mica stack between the micas and armatures thereof, said dielectric impregnant having a negative capacity-temperature characteristic, and said smaller mica stack including an amount of such impregnant causing substantial neutralization of the positive capacity-temperature characteristic of said non-impregnated mica stack.

16. A capacitor including two cooperating portions of which each includes mica sheets stacked together with the armatures, a dielectric impregnant for only one of said stacked portions between the micas and armatures thereof, said dielectric impregnant having a negative capacity-temperature characteristic, and establishing in said impregnated mica-stack portion a negative capacity-temperature characteristic which is more or less nearly equal to the opposite characteristic of the non-impregnated mica stack-portion; and means for adjusting said characteristic of said non-impregnated stack-portion to a condition of more nearly exact equivalency with said opposite characteristic for said impregnated stack-portion.

17. A capacitor including two cooperating portions of which each includes mica sheets stacked together with the armatures, a dielectric impregnant for only one of such stacked portions, between the micas and armatures thereof, said dielectric impregnant having a negative capacity-temperature characteristic; and means compressing together said elements of the non-impregnated stack-portion thereby reducing the positive capacity-temperature characteristic of said portion; said impregnated mica stack-portion including an amount of such impregnant causing substantial neutralization of said reduced positive capacity-temperature characteristic of the non-impregnated mica stack-portion.

18. A capacitor including two cooperating portions of which each includes mica sheets stacked together with the armatures, said capacitor as a whole having a substantially constant capacity over the working-temperature range by means of the provision of a dielectric impregnant in only one of said stacks of the capacitor between the micas and armatures thereof said dielectric impregnant having a negative capacity-temperature characteristic, and said impregnated mica-stack including an amount of such impregnant causing substantial neutralization of the positive capacity-temperature characteristic of said non-impregnated mica-stack.

19. A capacitor including two cooperating portions each including cooperating armatures and interposed dielectric, said capacitor as a whole having a substantially constant capacity over the working-temperature range by means of the provision of a dielectric impregnant for only one of said portions of the capacitor between the successive armatures of said portion, said non-impregnated capacitor portion having a given capacity-temperature characteristic, said impregnant having an opposite capacity-temperature characteristic, and said impregnated capacitor portion including an amount of such impregnant depending on the degree of proximity of the elements of the non-impregnated portion to one another, which causes substantial neutralization of the capacity-temperature characteristic of the two capacitor portions.

20. A capacitor including two cooperating portions each including cooperating armatures and interposed dielectrics, an impregnant for only one of said portions and establishing in said impregnated portion a capacity-temperature characteristic opposite and more or less nearly equal to that of the non-impregnated capacitor-portion; and means for adjusting said characteristic of said non-impregnated portion to a condition of more nearly exact equivalency with said opposite characteristic of said impregnated portion.

21. A capacitor including two cooperating portions each including cooperating amatures and interposed dielectric, said capacitor as a whole having a substantially constant capacity over the working temperature range by means of the provision of a dielectric impregnant for only one of said portions of the capacitor between the successive armatures of said portion, said non-impregnated capacitor portion having a positive capacity-temperature characteristic, said dielectric impregnant having a negative capacity-temperature characteristic, and said impregnated capacitor portion including an amount of such impregnant causing substantial neutralization of said positive characteristic of said non-impregnated capacitor portion.

22. A capacitor including two cooperating portions of which each includes solid dielectrics and armatures and naturally has a high positive capacity-temperature characteristic due substantially to the presence of air between the solid dielectrics and armatures; a negative characteristic solid impregnant for one of said portions replacing the air naturally present between the armatures; the two portions being arranged end to end adjacent one another; and means clamping the two portions together holding the elements of the non-impregnated portion together in position including between them reduced volumes of air naturally between them with corresponding reduction of said high positive characteristic of the non-impregnated portion; said impregnated portion containing an amount of such impregnant which establishes a negative characteristic in said impregnated portion tending to neutralize said reduced positive characteristic of said non-impregnated portion.

23. A capacitor including two cooperating portions of which each includes non-porous dielectrics and naturally has a high positive capacity-temperature characteristic due substantially to air on the faces of the dielectrics; means compressing together the elements of one of said capacitor-portions and holding them in position including between them reduced volumes of air naturally contained in that portion with corresponding reduction of said high positive characteristic; and an impregnant on the faces of the dielectrics of the other portion replacing said air naturally present between the armatures, said impregnant having a negative capacity-temperature characteristic; and said impregnated capacitor portion containing an amount of such dielectric impregnant which establishes a negative capacity-temperature characteristic in said impregnated portion as a whole which tends to neutralize said reduced positive characteristic of said compressed non-impregnated portion.

24. A capacitor including two cooperating portions each of which includes dielectric sheets stacked together with metal armature foils projecting from said stacks, the two stacks being arranged end to end with one another in alinement, but only one of them being provided with a dielectric impregnant, and all the projecting foils of like polarity in the two alined stacks being connected together as terminals of the capacitor as a whole.

25. A capacitor including mica sheets and foil sheets of which only a smaller proportion are separated from one another by dielectric impregnant, but all of which are held under a compression of the general order of one hundred and twenty pounds per square inch; said smaller portion of the capacitor constituted by the mica sheets and adjacent impregnant possessing a negative capacity-temperature characteristic which substantially neutralizes the other portion and imparts to the capacitor as a whole a substantially zero effective capacity-temperature characteristic.

26. A capacitor including two cooperating portions of which each includes mica sheets stacked together with the armatures and naturally possesses a high positive capacity-temperature characteristic, only one of said stack-portions being provided with a dielectric impregnant; said impregnant having a negative capacity-temperature characteristic; and said impregnated stack-portion containing an amount of such impregnant which compensates for the positive characteristic of the mica sheets in the same stack-portion and substantially compensates for the high positive characteristic of the other stack-portion.

27. A capacitor including two cooperative portions of which one consists exclusively of mica sheets and armature foils all closely associated face to face together with any air existing between said closely associated elements; and the other portion consists of a mica sheet and foils similarly associated but separated from one another by a dielectric impregnant substantially displacing the air between the facing elements.

28. A capacitor including two cooperating portions each including respectively positive and negative capacity-temperature characteristics in proportions substantially neutralizing one another over a substantially wide temperature range, said portions thereby constituting a capacitor unit which as a whole possesses a substantially zero capacity-temperature effect at all temperatures within such range.

29. A capacitor including two cooperating portions, the dielectric of one portion consisting substantially exclusively of mica and an impregnant having a negative capacity-temperature characteristic, and the dielectric of the cooperating capacitor-portion consisting substantially exclusively of mica and air.

30. A mica capacitor including a plurality of mica sheets and having a substantially zero capacity-temperature effect by virtue of the inclusion in the capacitor of dielectric coatings on only a portion of the total number of the mica sheets included in the capacitor.

WILLIAM M. BAILEY.